US007107078B2

(12) United States Patent
Lehto

(10) Patent No.: US 7,107,078 B2
(45) Date of Patent: Sep. 12, 2006

(54) METHOD AND SYSTEM FOR THE EFFECTING PAYMENTS BY MEANS OF A MOBILE STATION

(76) Inventor: Mariette Lehto, 7 Tredegar House, 97-99 Bow Road, Bow, London (GB) E3 2AN ( * ) Notice: Subject to any disclaimer, the term of this patent is extended or adjusted under 35 U.S.C. 154(b) by 543 days.

(21) Appl. No.: 09/903,225

(22) Filed: Jul. 11, 2001
(Under 37 CFR 1.47)

(65) Prior Publication Data
US 2003/0060186 A1    Mar. 27, 2003

Related U.S. Application Data

(63) Continuation of application No. PCT/FI00/00020, filed on Jan. 12, 2000.

(30) Foreign Application Priority Data
Jan. 13, 1999 (FI) .................................. 990053

(51) Int. Cl.
H04B 1/38 (2006.01)
G06Q 30/00 (2006.01)
G06Q 40/00 (2006.01)
H04L 12/28 (2006.01)

(52) U.S. Cl. ................. 455/566; 370/401; 705/14; 705/26; 705/39; 705/40

(58) Field of Classification Search ............ 235/380, 235/383; 370/313, 401; 455/566; 705/14, 705/26, 39, 40
See application file for complete search history.

(56) References Cited
U.S. PATENT DOCUMENTS
5,387,784 A * 2/1995 Sarradin .................. 235/380

6,331,972 B1 * 12/2001 Harris et al. ................ 370/313
6,595,417 B1 *  7/2003 O'Hagan et al. ........... 235/383
6,654,378 B1 * 11/2003 Mahany et al. ............. 370/401
6,832,718 B1 * 12/2004 Sarradin .................... 235/380

* cited by examiner

Primary Examiner—Wing Chan
Assistant Examiner—Thjuan P. Knowlin
(74) Attorney, Agent, or Firm—Cohen, Pontani, Lieberman & Pavane

(57) ABSTRACT

A method and system for effecting payments made by means of a mobile station in a telecommunication system that includes a telephone network, a network application connected to the telephone network, a mobile station connected to the telephone network via a wireless link system and a mobile station application. In the method, a user profile is generated in the network application from the modes of payment, a mode of payment message for transmission to the mobile station and based on the user profile is generated by the network application in a payment situation, the payment alternatives are presented to the user on the mobile station and a response message based on user input is generated and sent to the network application. In the system, the network application comprises means for generating a user profile from the modes of payment employed by the user, and means for generating a mode of payment message based on the user profile and for sending that message to the mobile station in a payment situation. The mobile station application comprises means for presenting the payment alternatives via the mobile station and means for generating a response message to the network application on the basis of user input.

10 Claims, 2 Drawing Sheets

| | MODES OF PAYMENT | | |
|---|---|---|---|
| | X1 | X2 | X3 |
| CUSTOMER A1 | YES | YES | NO |
| CUSTOMER A2 | NO | NO | YES |
| CUSTOMER A3 | YES | NO | YES |

| | MODE OF PAYMENT X1 | | |
|---|---|---|---|
| | M1 | M2 | M3 |
| CUSTOMER A1 | YES | YES | NO |
| CUSTOMER A2 | NO | NO | YES |
| CUSTOMER A3 | YES | NO | YES |

METHOD AND SYSTEM FOR THE EFFECTING PAYMENTS BY MEANS OF A MOBILE STATION

BACKGROUND OF THE INVENTION

1. Field of the Invention

The present invention relates to telecommunication systems. In particular, the invention is directed to a method and system for the management and implementation of payments made by means of a mobile station.

2. Description of Related Art

It is known that electronic payment can be effected in a wireless manner, as for example through the use of a portable computer connected to a mobile station, or a communication link to a bank that is established via an Internet link or a direct modem connection. Payment by means of a mobile station is performed using, for example, a service based on short messages, in which case the mobile station user communicates by means of short messages with a banking application that is connected to the telephone network. A payment application based on short messages especially differs from an application implemented using a computer in that the display of a mobile station is only capable of presenting a limited amount of information. Moreover, the data transfer capacity between a computer and a banking application is considerably higher than in the case of a short message application, so the amount of information to be transmitted does not currently constitute a problem like that encountered in a short message environment. Thus, on a computer display it is possible to implement a user interface in which a number of different ways of effecting a payment transaction are presented for selection by the user.

At this point in time, payment applications that are executed using a mobile station are at an initial stage of their development, and are as a consequence often difficult to use. Heretofore known methods of payment include individual account transfers by means of short messages, charges billed in conjunction with the user's standard telephone bill, prepayments of money to a given account, and so-called intelligent card purses or net purses which are charged in conjunction with a service transaction. For the user, however, there is no handy way to select the method of payment for a particular situation that has arisen based on current circumstances or the user's wishes.

OBJECTS AND SUMMARY OF THE INVENTION

It is accordingly the desideratum of the present invention to solve or at least significantly reduce the deficiencies of the aforementioned problems.

It is a particular object of the invention to provide a new method and system for ready and convenient user control of the various different available modes of payment using a mobile station without requiring needless or extraneous data transfer.

In this regard, the present invention is directed to a method for effecting payments by means of a mobile station in a telecommunication system which comprises a telephone network, a network application connected to the telephone network, a mobile station connected to the telephone network via a wireless communications link, and a mobile station application. The telephone network may for example be a GSM (Global System for Mobile communications) network and the network application is typically implemented in an appropriate network element or elements.

In the inventive method, a user profile is created in the network application from the modes of payment that are employed by or specified by the user. The user profile is thus formulated in accordance with the user's own preferences and choices, thereby allowing the user to choose those parameters to be applied in selection of the mode of payment for a wide range of applications and circumstances. When a payment is to be made, a mode of payment message to be sent to the mobile station is generated by means of the network application on the basis of the user profile. The payment alternatives derived from the user profile are presented to the user via the mobile station, from which the user can then make his or her choice. A response message that is generated on the basis of the user's input, typically in response to the payment alternatives that have been presented to the user, and which includes the user's payment alternatives selection is sent to the network application.

In one or more embodiments of the inventive method, the mode of payment message defines that part of the mode of payment message, such as the particular information or payment alternatives, to be presented to the user via the mobile station. The mode of payment message may also include other information relating to the payment transaction, as for example encryption or verification codes used by the payment application implemented in the mobile station, which may or may not be presented to the user on the display of the mobile station. Inasmuch as the invention is preferably applied in a multiple-service base or environment or in an application also used to implement a plurality of services, in some embodiments of the invention a control code may be defined and included in the mode of payment message for identifying the particular network application to which the mode of payment message relates. The control code is thus used to distinguish that particular payment application from other services that are available or selectable in the network.

In one or more embodiments of the inventive method, the processing of the response message at or by the network application is carried out on the basis of the information contained in the user profile. In this case, the network application decrypts and analyzes the response message. The inventive method of such embodiments preferably comprises a step in which, after the response message has been analyzed, the mobile station may be asked to supply additional information to complete the payment transaction. In one particular contemplated embodiment, the method additionally comprises a step in which the network application activates a new payment program as a result or consequence of its analysis of the response message.

The present invention is also directed to a system for effecting payments made via a mobile station in a telecommunication system as described above. In accordance therewith, the network application comprises means for generating a user profile from the modes of payment that have been applied or employed or specified by the user, and means for generating a mode of payment message based on the user profile and for sending the generated mode of payment message to the mobile station when a payment is to be made. The mobile station application comprises means for presenting the payment alternatives to the user by way of the mobile station, and means for generating a response message based on the user's input and for sending the generated response message to the network application.

In a preferred embodiment, the system further comprises means for defining the specific part or information that is contained in the mode of payment message and which is to be presented to the user by way of the mobile station. The system may further comprise means for defining, in the mode of payment message, a control code that identifies the particular network application which is the subject of the intended payment. In the same or other embodiments the network application may additionally comprise means for processing the response message on the basis of the user profile information. The network application may also comprise means for requesting additional information from the mobile station, and/or means for activating a new payment program.

As compared with prior art systems and methods, the present invention advantageously makes it possible to offer the user a variety of user-selectable alternatives, suitable for the particular purchase, for making a payment. The user has the option of choosing a desired mode of payment beforehand, which results in faster and still easier use of the application. Functions associated with payment can be automated. The use of profiles also makes it possible to limit the amount of information that needs to be presented to the user by way of the mobile station. For example, user-specific information relating to payments, such as credit card numbers and encryption data, can be stored in the network application, thus economizing on the use of radio link capacity. In addition, the application logic is implemented in the network, so that the invention does not impose any complex special requirements with respect to terminal equipment; as a consequence, the invention can be applied or implemented for use with a wide variety of terminal equipment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE CURRENTLY PREFERRED EMBODIMENTS

Figures 1, 2A, 2B:
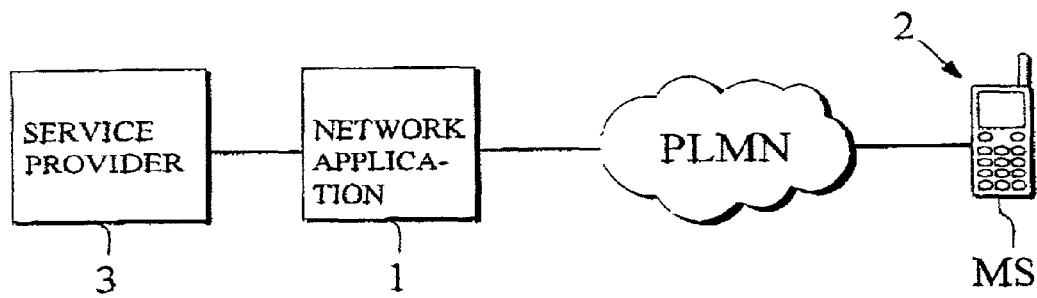
FIG. 1 is a block diagram of a system constructed in accordance with the present invention.
FIGS. 2a and 2b are tables presenting, by way of illustrative example, user profiles generated from and identifying various modes of payment.

FIG. 1 diagrammatically illustrates by way of preferred example a system implemented in accordance with the invention. To facilitate the following description, the block diagram presentation of FIG. 1 has been simplified to omit the many functional details that will be apparent to and which are readily executable by persons of ordinary skill in the art.

The inventive system, as shown in FIG. 1, comprises a telephone network PLMN which may by way of illustrative example be a GSM (Global System for Mobile communications) network or any similar digital mobile telephone network. The telephone network PLMN may also comprise parts of the public switched telephone network (PSTN), in which case the network PSTN will be connected to the mobile telephone network using a suitable protocol such, for example, as SS7 (Signaling System 7) signaling or some other common channel signaling protocol.

Connected to the telephone network PLMN is a network application 1 which is implemented, by way of example, in one of the network components of the telephone network, such as an intelligent network component, a mobile switching center, a short message service center or USSD center, and in systems and interfaces communicating therewith. The network application 1 may be a service base containing the physical equipment and software, with many of the means forming or contained in the network application 1 being implemented in software. The principal functions of the network application 1 include the provision of user-specific services, the management of service features, the maintenance of databases, and communication with a mobile station application 2.

In the system herein presented and described by way of illustrative example, the network application 1 is connected to a service provider 3, which in this case is intended to denote the provider of a commercial service for whose commodity or service the consumer is paying by mobile telephone, or the financial institution which takes care of the monetary transactions to be carried out in conjunction with the payment application. Connected to the telephone network, via a wireless communications link system which has been implemented using GSM or other suitable technology, is a mobile station MS. In general, the mobile station MS will be but one of a large multiplicity of such mobile stations that are connected through wireless links to the telephone network PSMN. Implemented in the mobile station MS is a mobile station application 2 which is operable and used, among other things, to provide and handle the encryption and verification functions needed in conjunction with the payment to be made. The mobile station application 2 may for example be implemented in the subscriber identity module (SIM) that is attached to or which otherwise forms a part of the mobile station MS. The mobile station application 2 may also be implemented in a parallel subscriber identity mobile, in the mobile station software, in a system communicating with one or more of them, or in any other convenient location or device so associated with the mobile station.

The network application 1 comprises means for generating a user profile based on the modes of payment employed or specified by the user. These means comprise a user interface by way of which the modes of payment that are defined for the user of the mobile station MS are transmitted to the network application 1. The means additionally comprise storage means for storing the user profiles in conjunction with the network application. The network application 1 also comprises means for generating a mode of payment message based on the user profile. The mode of payment message is transmitted to the mobile station MS, for example as a short message or USSD message, in which case the network application 1 generates from the user profile information a message of suitable form during the payment transaction. The network application 1 compares the payment transaction parameters with the user profile information, selects appropriate information from the user profiles and sends the message to the mobile station MS.

The mobile station application 2 comprises means for presenting a mode of payment message to the user on the mobile station MS, i.e. such as on the mobile station display. These means treat or process the payment message so that the message presented via the mobile station is in a form readily intelligible to the user. Other information, such as encryption or verification information, may also be sent in conjunction with or as a part of the mode of payment message. To identify the user, it is also possible to use the A-party identity data (for example) that is transmitted in the network signaling operations. The mobile station 2 additionally comprises means for filtering from the payment message the specific information from the payment message which is to be presented to the user. The mode of payment message may also comprise a control code that is added by the network application to distinguish the network application to which the mode of payment message relates from other available or accessible network services that use a like or corresponding method of communication.

The mobile station application 2 further comprises means for generating a response message to the network application 1. The response message is generated on the basis of feedback received from the user and processed in the mobile station application 2 to place it in the form used in message transmission.

The network application 1 further comprises means for treating or processing the response message such that the network application 1 compares the user profile information with the user's specified or selected choice. The network application 1 contains stored user information needed in conjunction with payment, such for example as credit card numbers. The network application 1 may further comprise means for requesting additional information from the mobile station and means for activating a new payment program in accordance with or response to or as a consequence of the received response message. In this case, the network application may send to the mobile station 2 a new message requesting, for example, the user's secret personal identification number of a bank card or corresponding account to complete the payment transaction. If the user selects a mode of payment that requires the execution or assistance of another payment application, then the network application 1 may activate that other payment program and transmit thereto the necessary information from the user profile.

FIG. 2a presents the details of the user profiles of several customer users in accordance with the invention. The modes of payment X1–X3 may, by way of example, correspond to payment by credit card, by bank card and by charging to one's telephone bill, respectively. The user profile defines the modes of payment used by or available to each customer; thus, in the table of FIG. 2a the available modes of payment defined for customer A3 are: charging by credit card, and charging to the customer's telephone bill.

FIG. 2b presents details of user profiles that contain general definitions relating to a single mode of payment and data indicating whether or not the subject parameter has an effect on that mode of payment. The alternatives M1–M3 identify, in this particular illustrative example, the amount of the payment, the date and the product being purchased. Thus, for customer A1, the amount to be paid has an effect on the mode of payment such that purchases for which the sum total exceeds a given limit are to be paid for by credit card. The date parameter may for example indicate that after a given date, such as the end of the current or a predetermined month, purchases are to be paid for by credit card. Similarly, the specific product being purchased may have an effect on the mode of payment to be applied; as where a customer A2 pays all fuel bills by credit card but all food bills by bank card.

Figure 3:
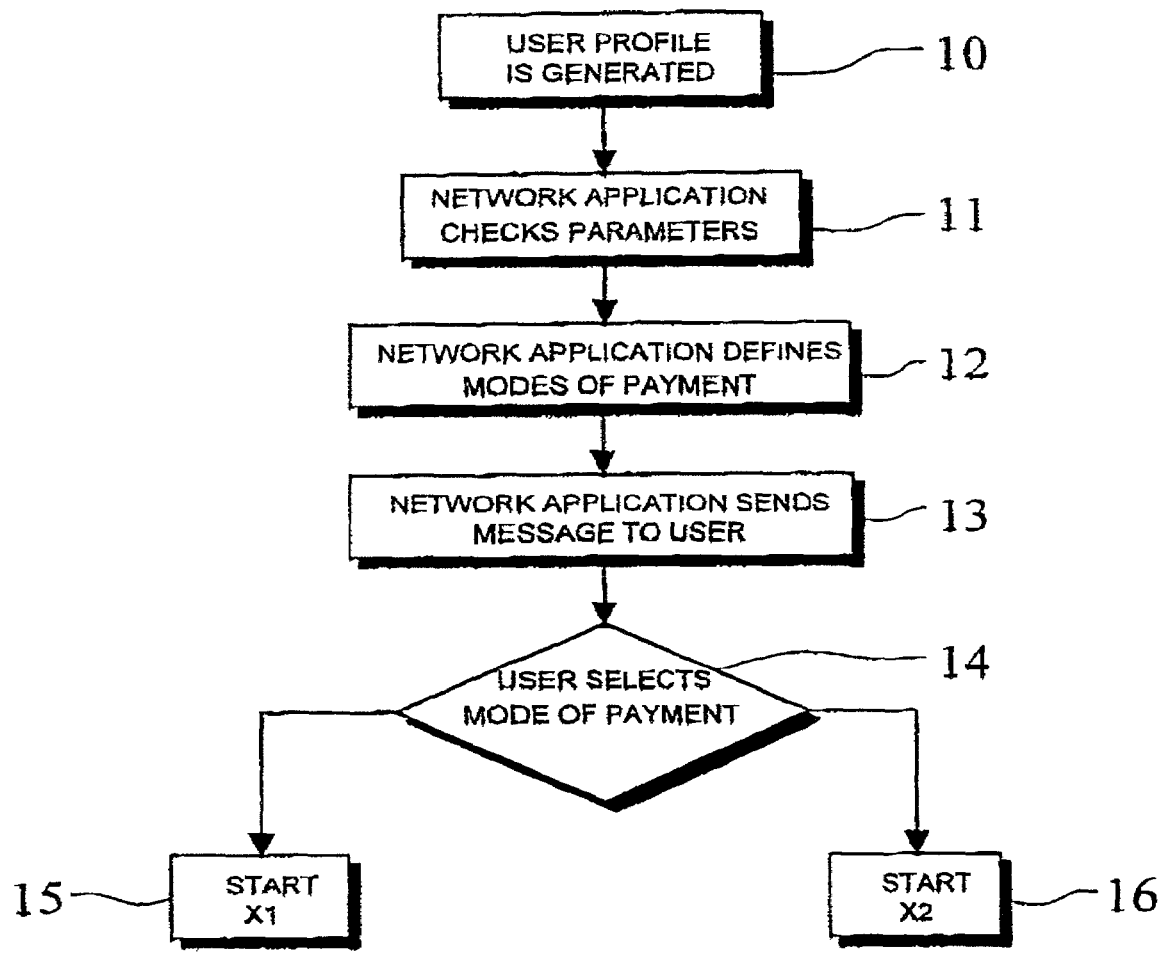
FIG. 3 is a flow chart of a method implemented in accordance with the present invention.

FIG. 3 depicts a flow chart of a currently preferred but nonetheless illustrative implementation of the inventive method. With reference to FIG. 3, at step 10 a user profile is generated in or by the network application 1 in accordance with the user's conduct and/or choices of alternative modes of payment. When a payment is to be made, the network application 1 at step 11 checks the user profile and the therein-defined parameters. At step 12, the network application 1 determines the modes of payment to be offered to the user for that particular payment type or situation. The network application 1 then generates a mode of payment message of appropriate form and sends it to the user's mobile station MS, which in turn presents the alternatives to the user at step 13. The user selects a particular mode of payment at step 14, whereupon the mobile station application 2 generates a response message to be sent to the network application 1. The network application 1 then analyzes the response message and continues its processing in accordance with the selection made by the user. If, for example, the database of the network application 1 already contains sufficient information required to effect the payment, such as the credit card number, then the network application 1 starts the appropriate payment application, which may be payment application X1 (step 15) or payment application X2 (step 16).

The present invention accordingly provides the mobile station user with the heretofore-unavailable ability to control the course of a payment transaction on the basis of his or her own choices. The network operator offers to the user only those services which the user has chosen to use or which meet the predetermined criteria relating to the particular situation. The services offered may therefore be notably varied as a function of the circumstances and particular situation.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for effecting user payment for a purchase by means of a mobile station of the user in a telecommunication system that includes a telephone network to which the mobile station is connected via a wireless communication link, a network application connected to the telephone network and a mobile station application, comprising the steps of:

generating and storing in the network application a user profile comprising user-specific information about alternative means of payment employable by the user;

generating by means of the network application, when the mobile station user is to make a purchase payment, a mode of payment message based on the user profile for transmission to the mobile station, the mode of payment message comprising a list of the alternative means of payment employable by the user;

presenting, on the mobile station, the list of the alternative means of payment for selection by the user; and generating a response message based on user input in response to the presented list of alternative means of payment and sending the response message to the network application, the response message indicating a means of payment selected by the user from the presented list of alternative means of payment.

2. A method in accordance with claim 1, further comprising the step of defining, for inclusion in the mode of payment message, a control code for identifying the network application.

3. A method in accordance with claim 1, further comprising the step of processing the response message at the network application in accordance with the user profile information.

4. A method in accordance with claim 1, further comprising the step of requesting, by the network application, additional information from the mobile station by means of which a payment is to be effected.

5. A method in accordance with claim 1, further comprising the step of activating, by the network application, a new payment program in response to receipt by the network application of the response message from the mobile station.

6. A system for effecting user payment for a purchase by means of a mobile station of the user in a telecommunication system that includes a telephone network to which the mobile station is connected via a wireless communication link, said system comprising:
  a network application connected to the telephone network and comprising means for generating a user profile comprising user-specific information about alternative means of payment employable by the user and means for generating, when the mobile station user is to make a purchase payment, a mode of payment message based on the user profile and for sending the generated mode of payment message to the mobile station, said mode of payment message comprising a list of the alternative means of payment employable by the user; and
  a mobile station application associated with the mobile station and comprising means for presenting, on the mobile station, said list of the alternative means of payment for selection by the user, and means for generating a response message based on user input in response to the presented payment alternatives, the response message indicating a means of payment selected by the user from the presented list of alternative means of payment.

7. A system in accordance with claim 6, further comprising means in the mode of payment message for defining a control code that identifies the network application.

8. A system in accordance with claim 6, wherein said network application further comprises means for processing the response message based on the user profile information.

9. A system in accordance with claim 6, wherein said network application further comprises means for requesting additional information from the mobile station by means of which a payment is to be effected.

10. A system in accordance with claim 6, where said network application further comprises means for activating a new payment program in response to receipt by the network application of the response message from the mobile station.

* * * * *